US011856159B2

(12) United States Patent
Sato

(10) Patent No.: US 11,856,159 B2
(45) Date of Patent: Dec. 26, 2023

(54) INFORMATION PROCESSING APPARATUS THAT CONVERTS COORDINATE BASED OPERATION INFORMATION RECEIVED VIA A REMOTE SCREEN OF ANOTHER APPARATUS INTO NON-COORDINATE BASED OPERATION INFORMATION USABLE AT THE INFORMATION PROCESSING APPARATUS, CONTROL METHOD THEREOF, AND STORAGE DEVICE

(71) Applicant: CANON KABUSHIKI KAISHA, Tokyo (JP)

(72) Inventor: Tomoya Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/875,017

(22) Filed: Jul. 27, 2022

(65) Prior Publication Data
US 2023/0035777 A1 Feb. 2, 2023

(30) Foreign Application Priority Data
Jul. 28, 2021 (JP) .................................. 2021-123272

(51) Int. Cl.
*H04N 1/00* (2006.01)
*G06F 3/12* (2006.01)
*G06F 3/04842* (2022.01)

(52) U.S. Cl.
CPC ..... *H04N 1/00384* (2013.01); *G06F 3/04842* (2013.01); *G06F 3/1285* (2013.01);
(Continued)

(58) Field of Classification Search
None
See application file for complete search history.

(56) References Cited

U.S. PATENT DOCUMENTS 11,606,470 B2 * 3/2023 Yano ................... G06F 3/1253
2013/0208306 A1 * 8/2013 Fukasawa .......... H04N 1/00501
358/1.15
(Continued)

FOREIGN PATENT DOCUMENTS

| JP | 3296090 B2 * | 6/2002 |
| JP | 2007004363 A * | 1/2007 |
| JP | 2014006668 A | 1/2014 |

OTHER PUBLICATIONS

Kato, (JP-3296090-B2), Abstract, Figs 2, 4, 5 (Year: 2002).*
Hisanaga, (JP-2007004363-A), Abstract, Figs 2, 4 (Year: 2007).*

*Primary Examiner* — Miya J Cato
(74) *Attorney, Agent, or Firm* — Canon U.S.A., Inc. IP Division

(57) ABSTRACT

An information processing apparatus configured to communicate with a terminal and including a hardware key includes a memory and at least one processor in communication with the memory. The at least one processor of the information processing apparatus is configured to perform transmitting, to the terminal, information about a screen corresponding to a screen displayed on a display unit included in the information processing apparatus, receiving, from the terminal, operation information including coordinate information, the operation information corresponding to a user operation received on the screen displayed on the terminal based on the transmitted information about the screen, converting the operation information into operation information corresponding to the hardware key based on the coordinate information included in the received operation information, and executing processing based on the converted operation information.

20 Claims, 16 Drawing Sheets

(52) U.S. Cl.
CPC ..... *H04N 1/00307* (2013.01); *H04N 1/00411* (2013.01); *H04N 1/00973* (2013.01); *G06F 3/1205* (2013.01); *G06F 3/1208* (2013.01); *G06F 3/1256* (2013.01)

(56) References Cited

U.S. PATENT DOCUMENTS

| | | | |
|---|---|---|---|
| 2014/0078549 A1* | 3/2014 | Amiya | H04N 1/00411 358/1.15 |
| 2014/0185090 A1* | 7/2014 | Ohata | H04N 1/00204 358/1.15 |
| 2021/0152699 A1* | 5/2021 | Saeda | H04N 1/00469 |

\* cited by examiner

FIG.13A

| REACTION AREA | COORDINATES | ALTERNATIVE HARDWARE KEY OPERATION | |
|---|---|---|---|
| AREA 1 | x: 0 – 132<br>y: 13 – 24 | OK KEY | ~1301 |
| AREA 2 | x: 0 – 132<br>y: 25 – 36 | DOWN ARROW KEY<br>OK KEY | ~1302 |
| AREA 3 | x: 0 – 132<br>y: 37 – 48 | DOWN ARROW KEY<br>DOWN ARROW KEY<br>OK KEY | ~1303 |
| AREA 4 | x: 0 – 132<br>y: 49 – 60 | DOWN ARROW KEY<br>DOWN ARROW KEY<br>DOWN ARROW KEY<br>OK KEY | ~1304 |

FIG.13B

| | |
|---|---|
| AREA 1 | ~1310 |
| AREA 2 | ~1311 |
| AREA 3 | ~1312 |
| AREA 4 | ~1313 |

FIG.13C

| REACTION AREA | COORDINATES | ALTERNATIVE HARDWARE KEY OPERATION | |
|---|---|---|---|
| AREA 1 | x: 0 – 132<br>y: 13 – 24 | UP ARROW KEY<br>OK KEY | ~1301 |
| AREA 2 | x: 0 – 132<br>y: 25 – 36 | OK KEY | ~1302 |
| AREA 3 | x: 0 – 132<br>y: 37 – 48 | DOWN ARROW KEY<br>OK KEY | ~1303 |
| AREA 4 | x: 0 – 132<br>y: 49 – 60 | DOWN ARROW KEY<br>DOWN ARROW KEY<br>OK KEY | ~1304 |

| REACTION AREA | COORDINATES | ALTERNATIVE HARDWARE KEY OPERATION | |
|---|---|---|---|
| AREA 1 | x: 10 – 60<br>y: 44 – 59 | LEFT ARROW KEY<br>OK KEY | ~1401 |
| AREA 2 | x: 71 – 121<br>y: 44 – 59 | OK KEY | ~1402 |

| REACTION AREA | COORDINATES | ALTERNATIVE HARDWARE KEY OPERATION |
|---|---|---|
| AREA 1 | x: 40 – 90<br>y: 44 – 59 | OK KEY |

~1501

1510

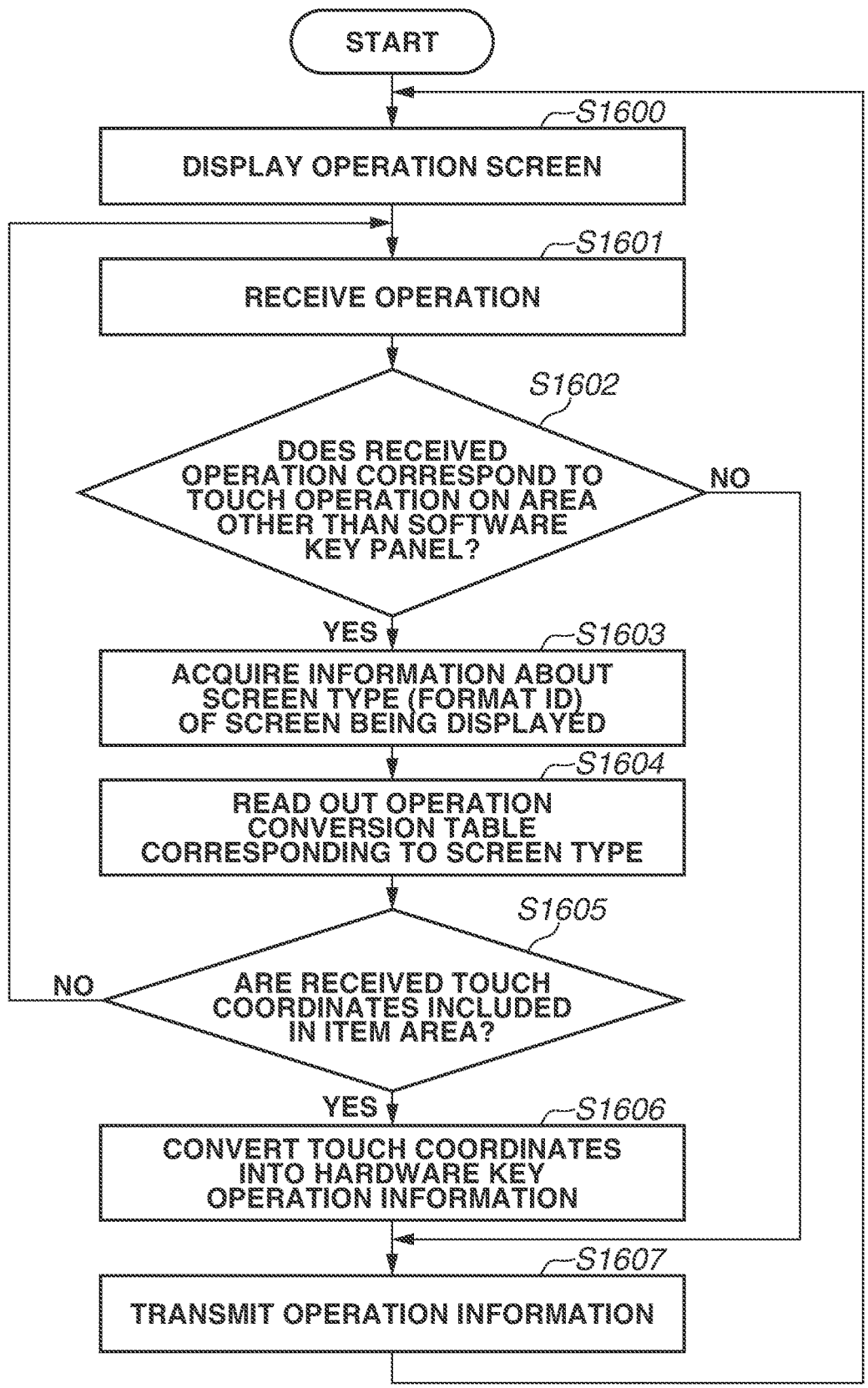

INFORMATION PROCESSING APPARATUS THAT CONVERTS COORDINATE BASED OPERATION INFORMATION RECEIVED VIA A REMOTE SCREEN OF ANOTHER APPARATUS INTO NON-COORDINATE BASED OPERATION INFORMATION USABLE AT THE INFORMATION PROCESSING APPARATUS, CONTROL METHOD THEREOF, AND STORAGE DEVICE

BACKGROUND

Field

The present disclosure relates to controls for remotely operating an apparatus.

Description of the Related Art

The remote operation function is used in remote operation of an apparatus. The function is carried out by, for example, software called virtual network computing (VNC). VNC server software is started in an apparatus that includes the VNC server, and VNC client software is started to connect to the VNC server and performs remote operations. Communications between the VNC server and the VNC client are made in compliance with a remote framebuffer (RFB) protocol (RFC 6143). For example, an apparatus including the VNC server function transmits screen information about an operation screen to a terminal including the VNC client function. The terminal displays a screen that is the operation screen displayed on the operation panel of the apparatus based on the received screen information. A user performs operations on the screen display on the terminal, thereby enabling the apparatus to perform processing without operation on the operation panel of the apparatus.

Japanese Patent Application Laid-Open No. 2014-6668 discusses a method of disabling the touch operation in response to when the VNC client receives a touch operation (e.g., a pinch-in operation) that cannot be detected by the touch operation support VNC server apparatus under the remote operation.

A VNC server apparatus including a graphical user interface (GUI) allows a user to perform intuitive operations with UI components such as buttons displayed on the screen using a mouse or a touch panel. In remotely operating such an apparatus from a VNC client that supports touch operations, the user can intuitively select items such as a button by touching the button on the screen displayed on the VNC client.

However, some apparatuses do not support the above-described operations using a mouse or a touch panel. Such an apparatus is provided with hard keys (e.g., up and down arrow keys), for example. A user can move the focus on an item such as a button displayed on the screen to make a desired item selectable and press a hard key (enter key) to select the desired item. In remotely operating such an apparatus, for example, from a VNC client apparatus that supports touch operations, the user attempts to perform an operation by touching an item on the displayed screen, but the VNC server apparatus that does not support touch operations cannot interpret the received operation.

SUMMARY

Various embodiments of the present disclosure provide a method that enables a user to perform intuitive operations even if the user remotely operates an apparatus provided with a screen operated with hardware keys from a terminal.

According to one embodiment of the present disclosure, an information processing apparatus configured to communicate with a terminal and including a hardware key includes a memory and at least one processor in communication with the memory. The at least one processor of the information processing apparatus is configured to perform transmitting, to the terminal, information about a screen corresponding to a screen displayed on a display unit included in the information processing apparatus, receiving, from the terminal, operation information including coordinate information, the operation information corresponding to a user operation received on the screen displayed on the terminal based on the transmitted information about the screen, converting the operation information into operation information corresponding to the hardware key based on the coordinate information included in the received operation information, and executing processing based on the converted operation information.

Further features of the present disclosure will become apparent from the following description of example embodiments with reference to the attached drawings.

BRIEF DESCRIPTION OF THE DRAWINGS

FIGS. 13A to 13C each illustrate an operation information conversion table and screen information according to one embodiment.

FIG. 16 is a flowchart illustrating operation information conversion processing on the VNC client according to one embodiment.

DESCRIPTION OF THE EMBODIMENTS

Some example embodiments for implementing the present invention will be described below with reference to the drawings. The following example embodiments are not meant to limit the scope of the present invention as encompassed by the appended claims. Further, not all combinations of features described in the example embodiments are used in all solutions of the present disclosure. In the following example embodiments, an image forming apparatus is described as an example of an information processing apparatus according to the present invention. However, the information processing apparatus according to the present invention is not limited thereto.

Figure 1:
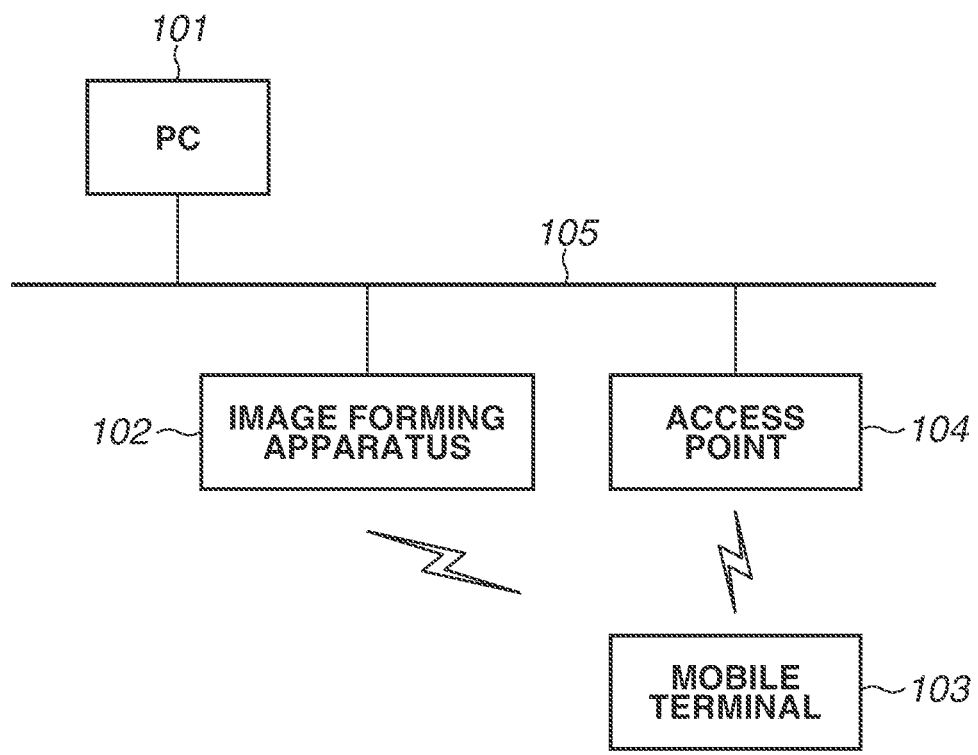
FIG. 1 is a block diagram illustrating a configuration example of an information processing system according to a first example embodiment.

FIG. 1 is a block diagram illustrating a configuration example of an information processing system according to a first example embodiment. A local area network (LAN) 105 is connected to an image forming apparatus 102 that includes a virtual network computing (VNC) server function, a personal computer (PC) 101 that functions as an information processing apparatus that includes a VNC client function, and an access point 104. A mobile terminal 103 that functions as an information processing apparatus includes the VNC client function is connected to the LAN 105 via the access point 104. If the image forming apparatus 102 and the mobile terminal 103 each include a wireless direct communication function, the image forming apparatus 102 and the mobile terminal 103 can directly communicate with each other without using the LAN 105. In the present example embodiment, an example will be described where the mobile terminal 103 that includes the VNC client function is connected by VNC to the image forming apparatus 102 that includes the VNC server function. However, any other apparatus (e.g., the PC 101 or another image forming apparatus) can be connected as a VNC client, as long as the apparatus includes a VNC client function.

The image forming apparatus 102 that operates as a VNC server is hereinafter referred to as a server. Each of the information processing apparatuses such as the PC 101 and the mobile terminal 103 to be connected to the server by VNC is referred to as a client.

The image forming apparatus 102 that includes the VNC server function transmits to the client screen information corresponding to a screen displayed on a display unit included in the image forming apparatus 102. The client that has acquired the screen information displays a screen corresponding to the screen displayed on the image forming apparatus 102. When an operation is performed on the screen displayed on the client, the operation information is transmitted to the image forming apparatus 102. Then, the image forming apparatus 102 performs processing depending on the operation. In other words, the client establishes a VNC connection to the image forming apparatus 102, thereby allowing remote operations of the image forming apparatus 102.

First, the image forming apparatus 102 starts VNC server software. Then, the image forming apparatus 102 waits for a connection request from the client. Next, the mobile terminal 103 starts VNC client software. Then, the mobile terminal 103 connects to a desired server by a user operation. The communication between the server and the client is established in compliance with a remote framebuffer (RFB) protocol. The RFB protocol first performs handshake processing. After completion of the handshake processing, transmission and reception of screen information and operation information are performed.

Figure 2:
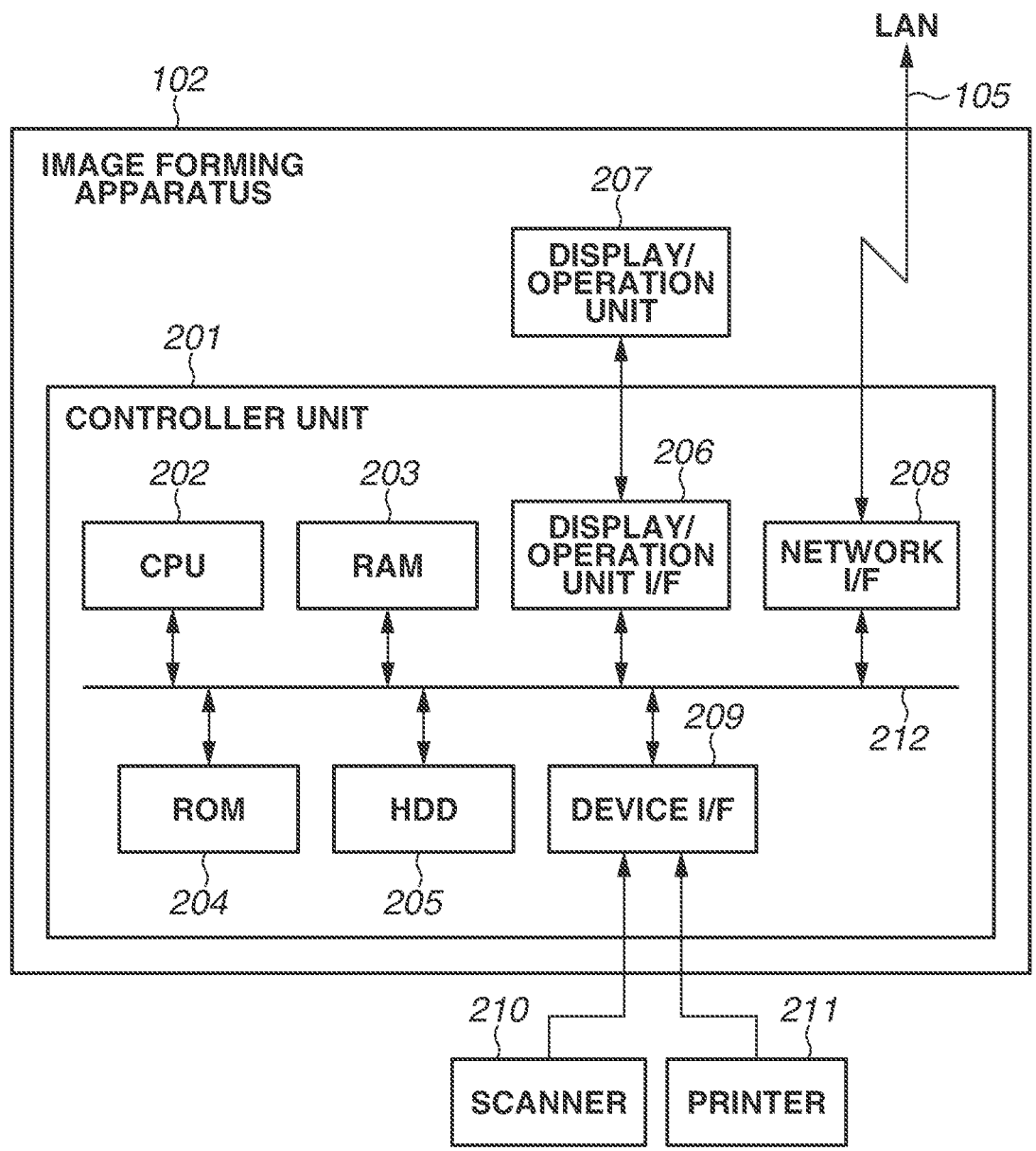
FIG. 2 is a block diagram illustrating a hardware configuration of an image forming apparatus according to one embodiment.

FIG. 2 is a block diagram illustrating a hardware configuration of the image forming apparatus 102. In a controller unit 201 of the image forming apparatus 102, a central processing unit (CPU) 202 is an arithmetic unit that controls the overall system operation. The CPU 202 controls devices connected to a system bus 212 in a comprehensive manner.

A read-only memory (ROM) 204 is a nonvolatile memory, and stores image data, data other than image data, various programs for causing the CPU 202 to operate, and other information.

A random access memory (RAM) 203 is a volatile memory used as a temporary storage area such as a main memory or a work area for the CPU 202. The RAM 203 also stores programs such as an operating system (OS), system software, and application software, and data.

The CPU 202 loads a program stored in the ROM 204 or other memories into the RAM 203 and runs the program to thereby control each unit of the image forming apparatus 102. The programs for causing the CPU 202 to operate are not limited to them stored in the ROM 204, but instead may be programs preliminarily stored in a hard disk drive (HDD) 205.

The HDD 205 stores an OS, system software, application software, image data, and setting data, for example.

However, any other storage device, such as a solid-state drive (SSD), a secure digital (SD) memory card, or an embedded MultiMediaCard (eMMC), can be used as long as the storage device can store data.

A display/operation unit interface (I/F) 206 is an interface unit for communication with a display/operation unit 207. The display/operation unit I/F 206 outputs information to be displayed on the display/operation unit 207 to the display/operation unit 207, and receives information input by a user from the display/operation unit 207. The display/operation unit 207 includes hardware keys to receive user operations.

Figure 6:
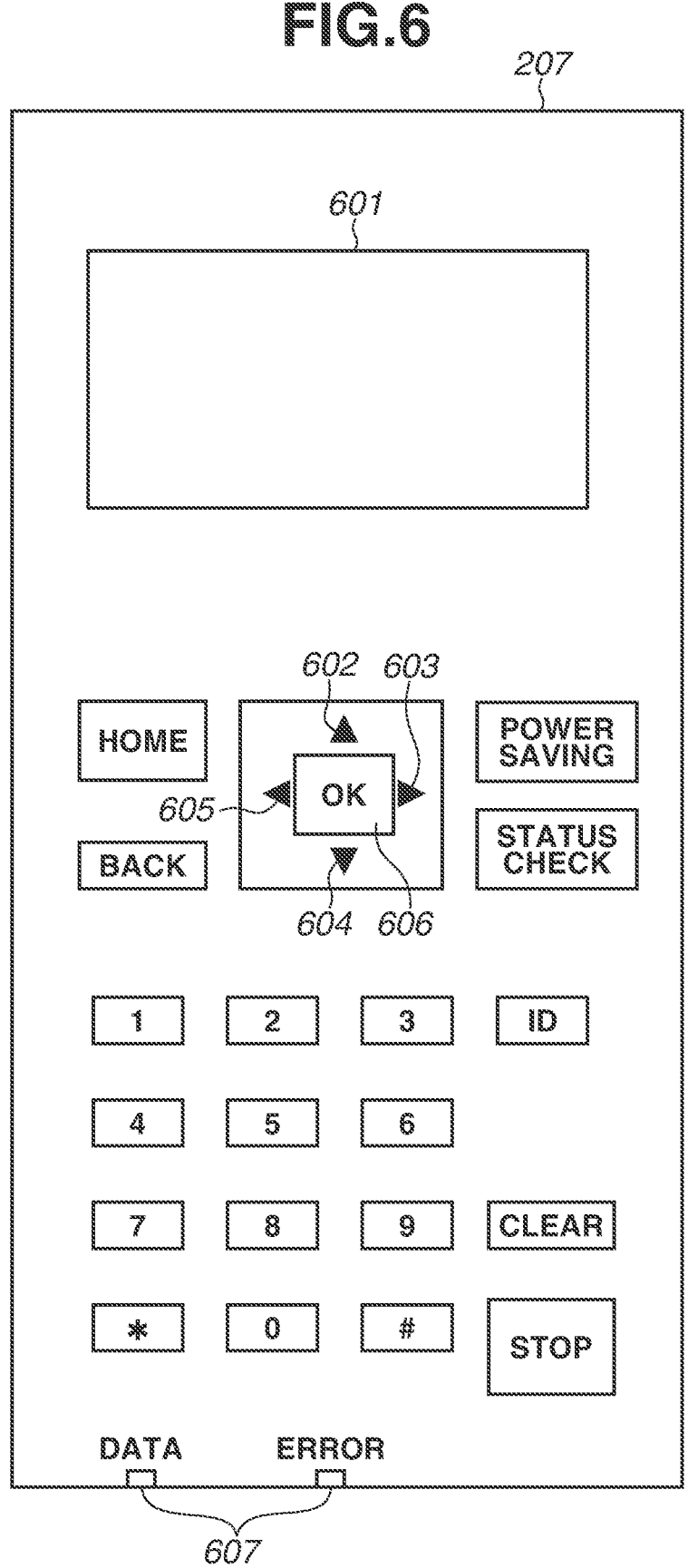
FIG. 6 illustrates an example of a display/operation unit according to one embodiment.

FIG. 6 is an overview diagram of the display/operation unit 207 in the image forming apparatus 102 according to the present example embodiment.

A display unit 601 is a display that displays various types of information such as a device state and input and output results. An up arrow key 602, a right arrow key 603, a down arrow key 604, a left arrow key 605, and an OK key 606 are hardware keys used to operate the image forming apparatus 102. Functions, such as a function for shifting a focus (an item in a selected state) on a screen for selecting an option, and a function for shifting the display screen to the previous screen or the next screen, are mainly allocated to the up arrow key 602, the right arrow key 603, the down arrow key 604, and the left arrow key 605. A function for determining on the selected item focused by operating the up arrow key 602, the right arrow key 603, the down arrow key 604, and the left arrow key 605 is mainly allocated to the OK key 606. In this manner, the image forming apparatus 102 is operated using hardware keys each functioning as an operation unit on the screen displayed on the display unit 601. That is, the image forming apparatus 102 cannot detect a touch operation on the screen displayed on the display unit 601 and is not compatible with an operation to be performed by a pointing device. In other words, the image forming apparatus 102 cannot determine a user operation based on coordinate information.

A notification light-emitting diode (LED) 607 is an LED for providing a notification about a device state. Examples of notification include a notification by an operation such as lighting or blinking, and a notification in a color.

A network I/F 208 is connected to the LAN 105 to communicate with the PC 101, which is also connected to the LAN 105, another image forming apparatus (not illustrated), and other devices, and to input and output information to and from the mobile terminal 103 via the access point 104.

A device I/F 209 connects a scanner 210 and a printer 211 each serving as an image input/output device to the controller unit 201 to input and output image data. Specifically, for example, image data is printed on sheets, or data on a document is scanned.

Figure 3:
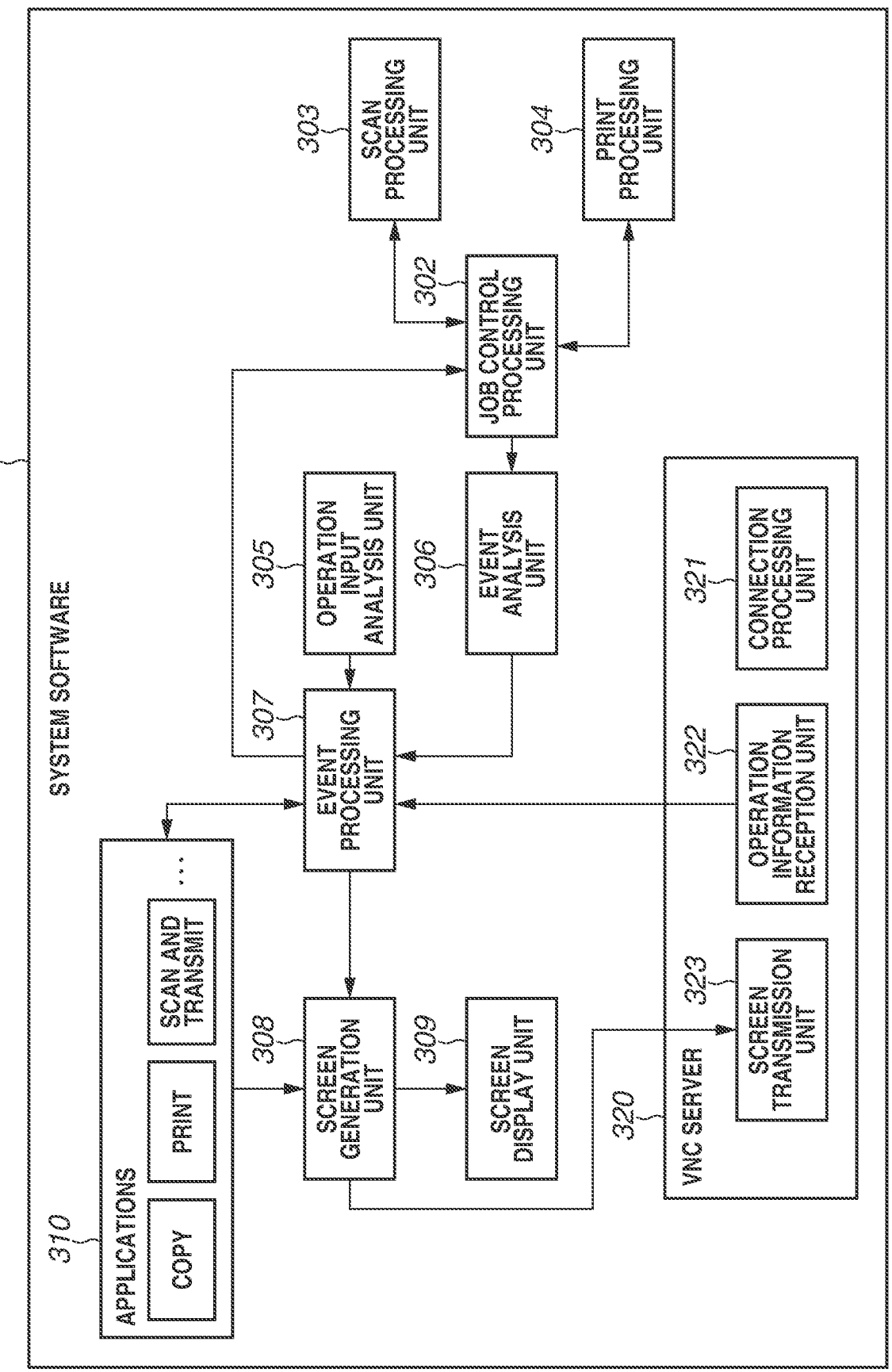
FIG. 3 is a block diagram illustrating a software configuration of the image forming apparatus according to one embodiment.

FIG. 3 is a block diagram illustrating a software configuration of the image forming apparatus 102. System software 301 is stored in the RAM 203, the ROM 204, or the HDD 205 and is run by the CPU 202.

A job control processing unit 302 controls software modules including applications 310 to thereby control jobs, such as copy, print, and scan jobs to be run by the image forming apparatus 102.

A scan processing unit 303 controls the scanner 210 via the device I/F 209 based on instructions from the job control processing unit 302, and performs processing for scanning a document placed on a platen glass of the scanner 210.

A print processing unit 304 controls the printer 211 via the device I/F 209 based on instructions from the job control processing unit 302, and performs processing for printing a designated image.

An operation input analysis unit 305 analyzes information supplied from the display/operation unit 207 via the display/operation unit I/F 206, and provides a notification about an event corresponding to a user operation to an event processing unit 307. Information to be analyzed by the operation input analysis unit 305 is operation information indicating pressing of hardware keys by the user.

An event analysis unit 306 receives operations and various events that occur in the image forming apparatus 102 from the job control processing unit 302, and analyzes the received events, and then provides event information corresponding to the events to the event processing unit 307. The various events to be analyzed by the event analysis unit 306 are events other than the events generated by user operations. Examples of the events to be analyzed by the event analysis unit 306 include completion of a job and lack of print sheets.

The event processing unit 307 receives events from the operation input analysis unit 305, the event analysis unit 306, an operation information reception unit 322, and the applications 310. The event processing unit 307 feeds information about each event to the job control processing unit 302, a screen generation unit 308, or the applications 310 depending on the event, and controls each unit of the image forming apparatus 102.

The screen generation unit 308 performs processing for generating screen data to be displayed on the display/operation unit 207 or a display unit of an external apparatus on the RAM 203.

A screen display unit 309 reads screen data generated by the screen generation unit 308 from the RAM 203, and performs display controls for displaying the screen data on the display of the display/operation unit 207 via the display/operation unit I/F 206.

The applications 310 are a group of applications to run on the image forming apparatus 102 and performs predetermined processing for, for example, receiving instructions from the user via the event processing unit 307, and providing event information for controlling each job according to instructions to the event processing unit 307. Examples of the applications 310 included in the image forming apparatus 102 include the following functions:

A copy function for printing, by the printer 211, image data generated by scanning an image on a document by the scanner 210

A print function for printing, by the printer 211, image data based on a print job input from an external apparatus such as the PC 101 or the mobile terminal 103

A scanning and transmission function for transmitting image data generated by scanning an image on a document by the scanner 210 to an external apparatus via the network I/F 208.

The applications 310 included in the image forming apparatus 102 are not limited to the above-described examples. Any other application can be added later in response to an instruction from the user.

A VNC server 320 is a software module for communicating with the client via the LAN 105. For example, the VNC server 320 performs processing for communicating with a VNC client 520 that operates on the mobile terminal 103, and for receiving remote operations.

A connection processing unit 321 receives, for example, a connection request from a connection processing unit 521 of the VNC client 520, and performs connection control processing.

The operation information reception unit 322 receives operation information from, for example, an operation information transmission unit 522 of the VNC client 520, performs operation information conversion processing to be described below, and feeds event information corresponding to a user operation to the event processing unit 307.

A screen transmission unit 323 performs processing for reading screen data generated by the screen generation unit 308 from the RAM 203 and transmitting the screen data to a screen reception unit 523 of the VNC client 520.

Figure 4:
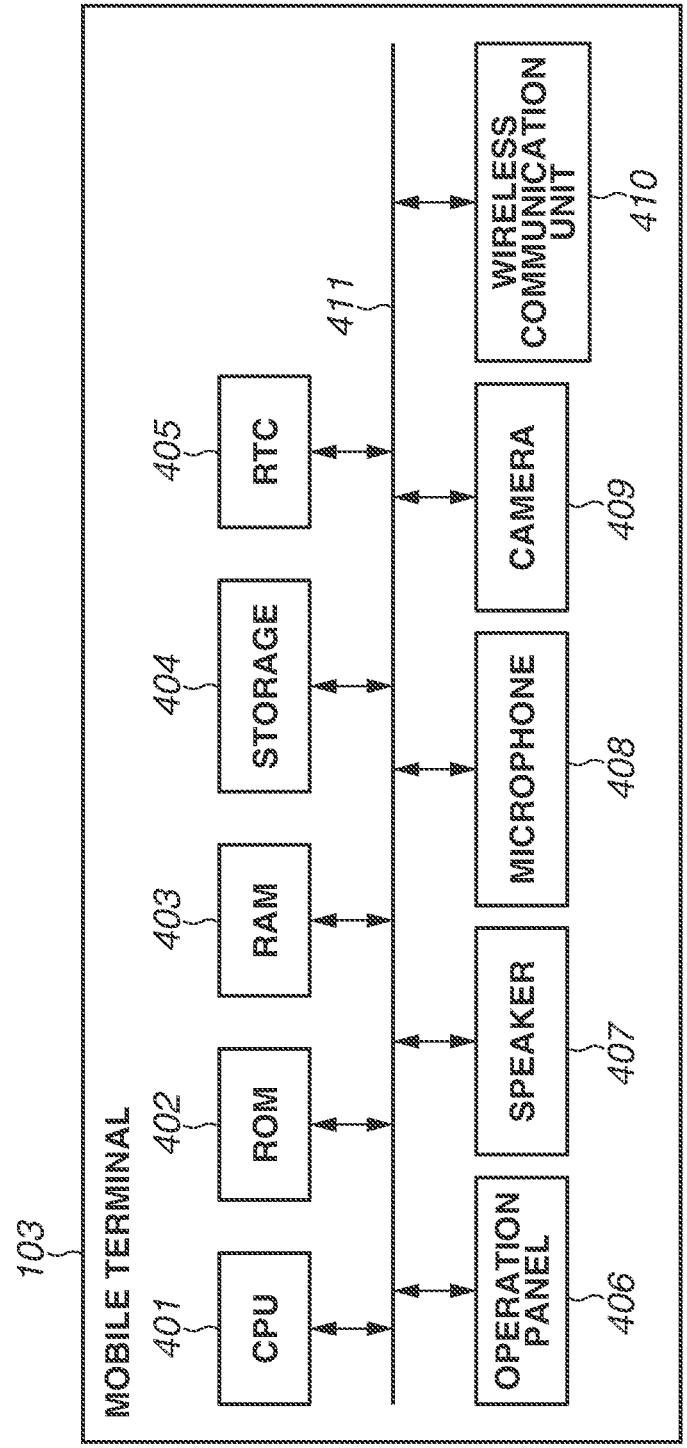
FIG. 4 is a block diagram illustrating a hardware configuration of a mobile terminal according to one embodiment.

FIG. 4 is a block diagram illustrating a hardware configuration of the mobile terminal 103. In the mobile terminal 103, a CPU 401 is an arithmetic unit that controls the overall system operation. The CPU 401 controls devices connected to a system bus 411 in a comprehensive manner.

A ROM 402 is a nonvolatile memory, and stores image data, data other than image data, various programs for causing the CPU 401 to operate, and other information. A RAM 403 is a volatile memory used as a temporary storage area such as a main memory or a work area for the CPU 401. The RAM 403 also stores programs such as an OS, system software, and application software, and data.

The CPU 401 loads a program stored in the ROM 402 or other memories into the RAM 403 and runs the program to thereby control each unit of the mobile terminal 103. The programs for causing the CPU 401 to operate are not limited to the programs stored in the ROM 402, but instead may be programs preliminarily stored a storage 404. The storage 404 stores an OS, system software, application software, photographs, electronic documents, setting data, and other data. However, any other storage device, such as an SSD, an SD memory card, or an eMMC, can be used as long as the storage device can store data.

A real-time clock (RTC) 405 measures an elapsed time.

An operation panel 406 includes a touch panel function with which touch operations performed by the user can be detected. The operation panel 406 displays various screens provided by an OS 530 and a multifunction peripheral (MFP) application 502. The user can input a desired operation instruction to the mobile terminal 103 by inputting a touch operation on the operation panel 406.

A speaker 407 and a microphone 408 are used, for example, when the user makes a call to another mobile terminal or a land line.

A camera 409 captures images in response to image capturing instructions from the user. The images captured by the camera 409 are stored in a predetermined area of the storage 404.

A wireless communication unit 410 performs wireless communication using, for example, a wireless communication LAN.

Figure 5:
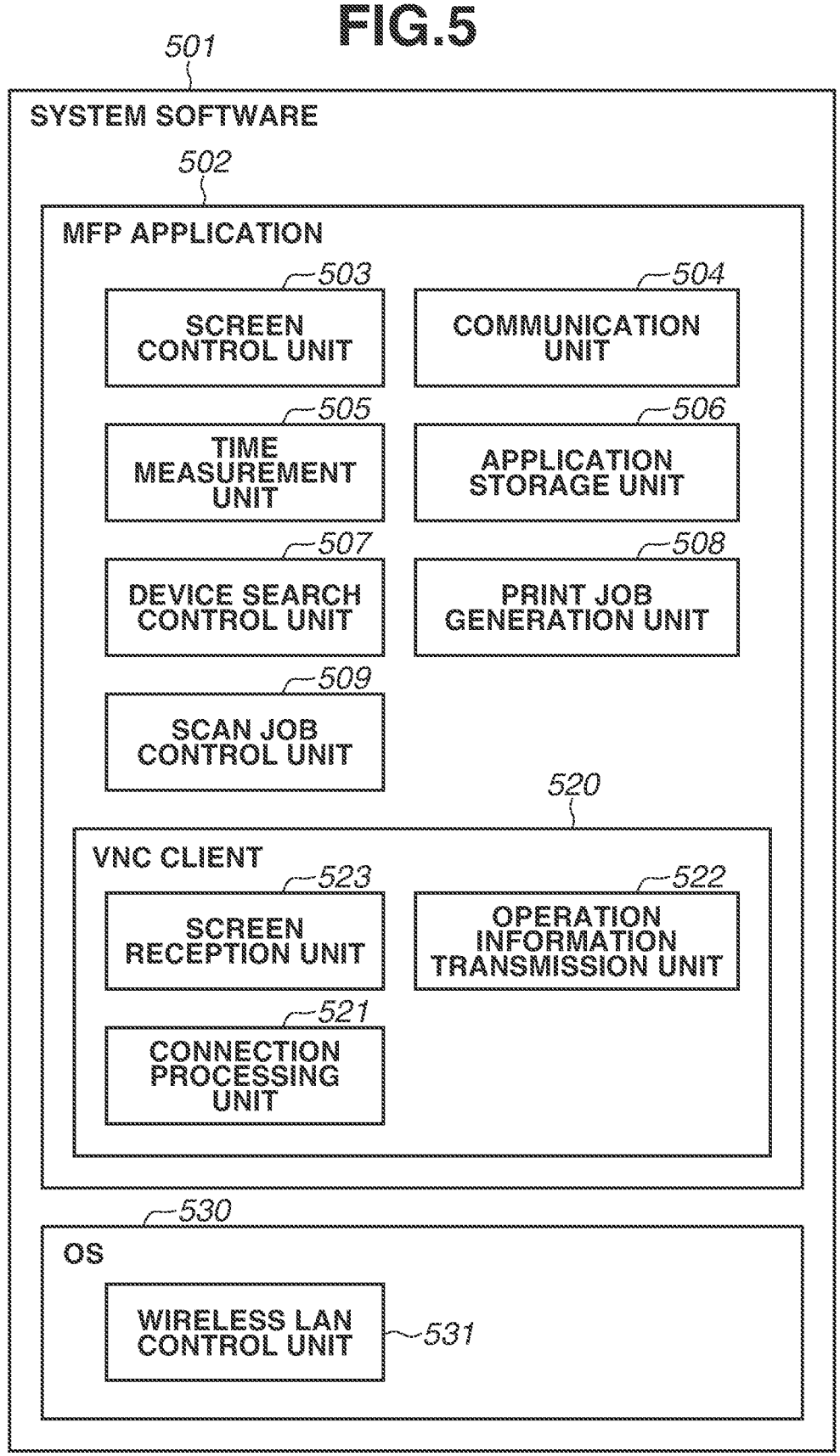
FIG. 5 is a block diagram illustrating a software configuration of the mobile terminal according to one embodiment.

FIG. 5 is a block diagram illustrating a software configuration of the mobile terminal 103. System software 501 is stored in the RAM 403, the ROM 402, or the storage 404 and is run by the CPU 401.

The OS 530 is software for controlling the overall operation of the mobile terminal 103.

Various applications, including the MFP application 502 to be described below, can be installed on the mobile terminal 103. The OS 530 exchanges information with these applications, and changes the screen to be displayed on the operation panel 406 in response to instructions received from each application. The OS 530 includes a device driver group for controlling various pieces of hardware, and provides an application programming interface (API) for using various pieces of hardware to the applications to run on the OS 530. In the present example embodiment, a wireless LAN control unit 531 is provided as an example of the device driver group.

The wireless LAN control unit 531 is a device driver for controlling the wireless communication unit 410.

The MFP application 502 is an application installed on the mobile terminal 103. The use of the MFP application 502 enables issuances of a print or scan instruction to an image forming apparatus such as the image forming apparatus 102, and also enables remote operations on the operation screen of the image forming apparatus. In addition to the MFP application 502, various other applications are installed on the mobile terminal 103. However, the description of the various other applications will be omitted.

The software configuration of the MFP application 502 will be described in more detail. A screen control unit 503 controls the screen displayed on the operation panel 406 via the OS 530. The screen control unit 503 displays the screen for the MFP application 502 on the operation panel 406. The screen control unit 503 determines an operation instruction input by the user via the operation panel 406. The screen control unit 503 reads image data recorded on an application storage unit 506 by the screen reception unit 523, and displays the image data on the operation panel 406 via the OS 530.

A communication unit 504 controls wireless communication performed by the wireless communication unit 410 via the OS 530 to thereby transmit and receive commands and other information.

A time measurement unit 505 measures an elapsed time.

The application storage unit 506 temporarily stores various information for running the MFP application 502 in the RAM 403.

A device search control unit 507 generates search data for searching for the image forming apparatus 102 to be connected, and the wireless communication unit 410 transmits the generated search data to each device on the LAN 105. Then, the device search control unit 507 receives a response from the corresponding image forming apparatus 102. The search data may be broadcasted to all devices on the LAN 105, or may be transmitted to one of the devices with its address designated.

A print job generation unit 508 generates a print job. The wireless communication unit 410 transmits the print job generated by the print job generation unit 508 to the image forming apparatus 102, and the image forming apparatus 102 performs printing.

A scan job control unit 509 is a control unit that carries out a scan function. The wireless communication unit 410 issues a scan instruction to the image forming apparatus 102, and displays scan data received from the image forming apparatus 102. The scanned data is stored in the application storage unit 506.

The VNC client 520 is a software module for remotely operating the image forming apparatus 102 in communication with the VNC server 320, which operates on the image forming apparatus 102, via the LAN 105.

The connection processing unit 521 receives a request from the user and transmits a connection request to the connection processing unit 321 of the VNC server 320, and performs connection processing.

The operation information transmission unit 522 receives an operation instruction input by the user via operation panel 406 from the screen control unit 503, and transmits the received operation instruction to the operation information reception unit 322 of the VNC server 320.

The screen reception unit 523 receives screen data from the screen transmission unit 323 of the VNC server 320, and records the received screen data on the application storage unit 506.

The communication between the VNC server 320 and the VNC client 520 is performed such that the CPU 202 and the CPU 401 control the network I/F 208 and the wireless communication unit 410, respectively.

The above-described processing performed by each software module enables display of a screen corresponding to a screen displayed on the display of the display/operation unit 207 of the image forming apparatus 102 on the operation panel 406 of the mobile terminal 103. The processing also enables the image forming apparatus 102 to remotely carry out various types of processing when the user performs operations on the operation panel 406 of the mobile terminal 103. As described above, the image forming apparatus 102 includes a screen displayed on the display that is operated using hardware keys, while the mobile terminal 103 includes a screen displayed on the display that is operated via touches on the screen using a pointer. That is, the mobile terminal 103 is an apparatus that supports operations with a pointing device. In other words, the mobile terminal 103 can determine an operation based on coordinate information. In the following description, the mobile terminal 103 that is operable via touches on its screen will be described as an example of an apparatus that supports operations with a pointing device. However, an apparatus that supports operations with a pointing device is not limited to this example. For example, a PC that uses a mouse or another device to shift a cursor may be used.

Figure 7A:
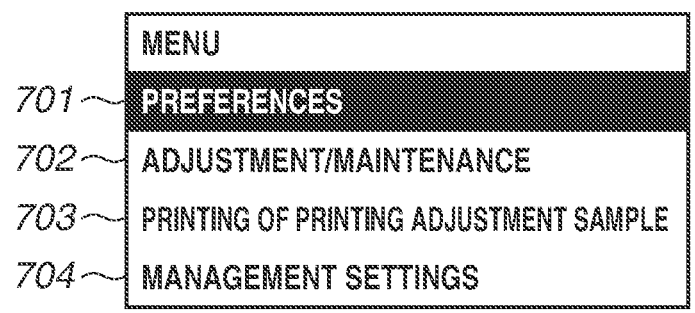
FIGS. 7A to 7C each illustrate an example of an operation screen generated by a screen generation unit according to one embodiment.
Figure 7B:
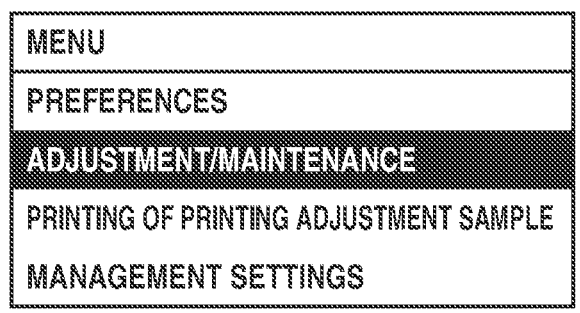
Figure 7C:
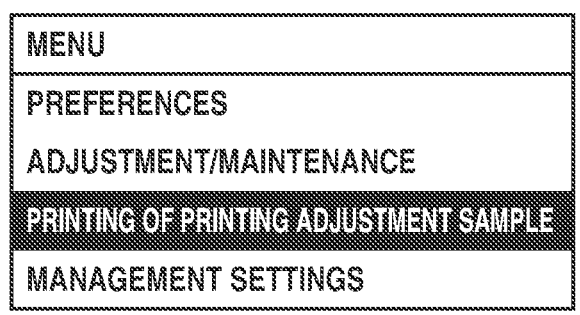

FIGS. 7A to 7C, FIGS. 8A and 8B, and FIG. 9 each illustrate an example of an operation screen displayed on the display unit 601 of the display/operation unit 207 in the image forming apparatus 102. Different types of operation screens are used and the layout of areas respectively corresponding to items are determined for each screen. One screen type is displayed from among a predetermined number of screen types (screen formats). FIGS. 7A to 7C each illustrate an example of a screen with a screen format ID=1. The screen format ID=1 indicates a screen used to select one item from a list of items. In screen examples illustrated in FIGS. 7A to 7C, one item is selected from among items "preferences (701)", "adjustment/maintenance (702)", "printing of printing adjustment sample (703)", and "management settings (704)". When one of these items is selected, the screen is shifted to the screen corresponding to the selected item. FIG. 7A illustrates a screen to be displayed when this screen is called. The row of "preferences (701)" is in the selected state. It is assumed herein that the user wishes to select the item of "printing of printing adjustment sample (703)". In this case, the user first presses the down arrow key 604 of the display/operation unit 207. When the down arrow key 604 is pressed, the row of "adjustment/maintenance (702)" becomes in the selected state on the screen illustrated in FIG. 7B. Further, when the down arrow key 604 is pressed again by the user, the item of "printing of printing adjustment sample (703)" becomes in the selected state on the screen illustrated in FIG. 7C. When the user presses the OK key 606 of the display/operation unit 207 in this state, the screen is shifted to the screen corresponding to the item of "printing of printing adjustment sample" illustrated in FIGS. 8A and 8B.

Figure 8A:
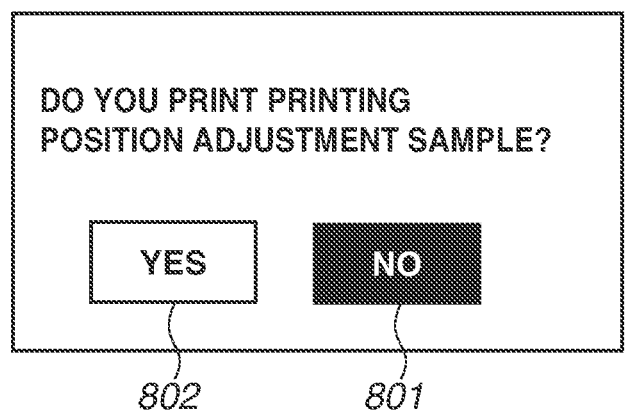
FIGS. 8A and 8B each illustrate an example of the operation screen generated by the screen generation unit according to one embodiment.
Figure 8B:
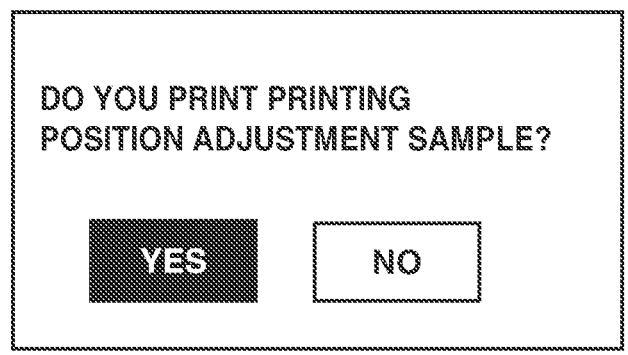

FIGS. 8A and 8B each illustrate an example of a screen with a screen format ID=2. The screen format ID=2 indicates a screen used to cause the user to select between two buttons. FIG. 8A illustrates a screen to be displayed when this screen is called and a "NO" button (801) is in the selected state. In this case, when the user presses the OK key 606, printing of a printing adjustment sample is not performed and the screen returns to the screen illustrated in FIGS. 7A to 7C. If the user wishes to perform sample printing, the user presses the left arrow key 605 on the operation panel 406. When the left arrow key 605 is pressed, a "YES" button (802) becomes in the selected state on the screen illustrated in FIG. 8B. If the user presses the OK key 606 in this state, printing of the printing adjustment sample is performed and the screen is shifted to the screen illustrated in FIG. 9.

Figure 9:
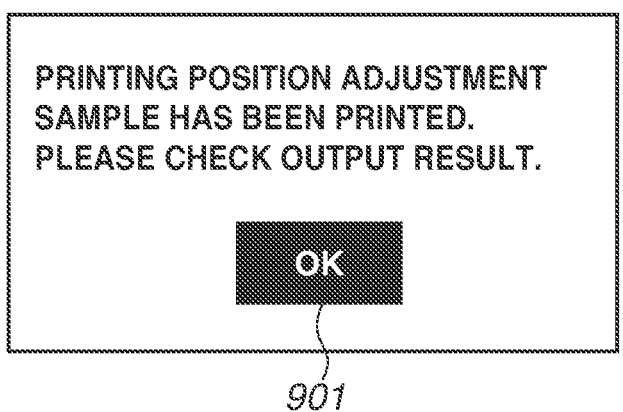
FIG. 9 illustrates an example of the operation screen generated by the screen generation unit according to one embodiment.

FIG. 9 illustrates an example of a screen with a screen format ID=3. The screen format ID=3 indicates a screen used to display one button and cause the user to select the button. FIG. 9 illustrates a screen to be displayed when this screen is called, and an "OK" button (901) is in the selected state. In this case, when the user presses the OK key 606, the screen returns to the screen illustrated in FIGS. 7A to 7C.

In this manner, the user shifts the focus (the item in the selected state) using the up arrow key 602, the right arrow key 603, the down arrow key 604, and the left arrow key 605, and presses the "OK key (606)" in a state where a desired item is selected, thereby performing operations on the image forming apparatus 102.

The screen types are not limited to the three types illustrated in FIGS. 7A to 7C, FIGS. 8A and 8B, and FIG. 9, and more screen types may be used. The screen generation unit 308 generates screens respectively corresponding to the screen types. The screen generation unit 308 holds the screen type of the screen currently being displayed and the state of the screen.

Figure 10A:
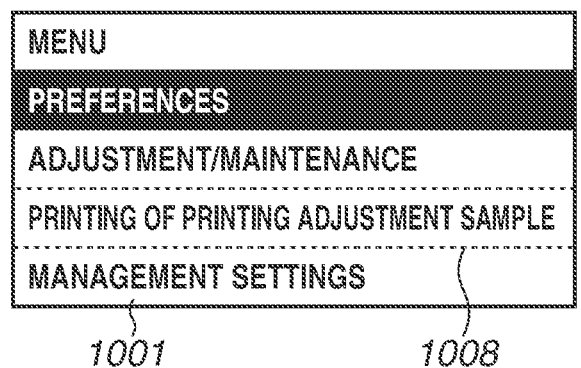
FIGS. 10A and 10B illustrate examples of a screen displayed on an operation panel of the mobile terminal according to one embodiment.
Figure 10B:
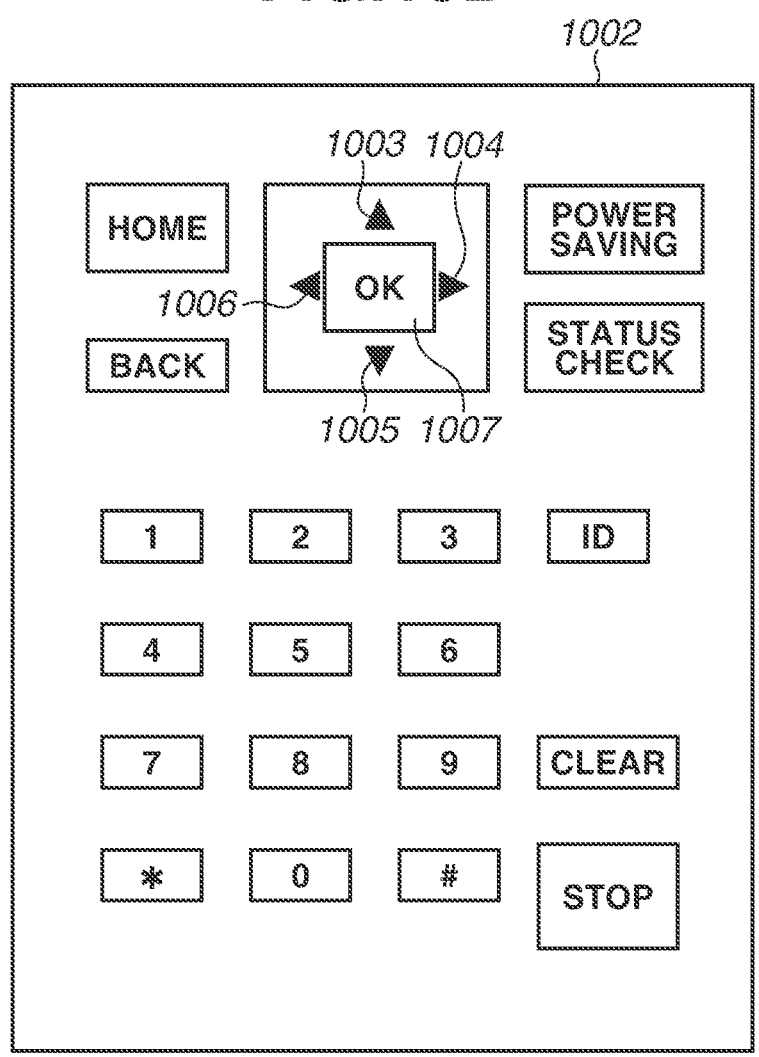

FIG. 10A illustrates an example of a screen to be displayed on the VNC client 520 connected to the image forming apparatus 102 when the screen illustrated in FIG. 7A is displayed on the image forming apparatus 102. The VNC client 520 displays a screen 1001 corresponding to the screen displayed on the display unit 601 illustrated in FIG. 7A. Further, in connecting to the image forming apparatus 102, the VNC client 520 receives information about the hardware keys included in the image forming apparatus 102 from the image forming apparatus 102, and displays a software key panel 1002 (illustrated in FIG. 10B) on which buttons corresponding to the hardware keys of the image forming apparatus 102 are displayed based on the received hardware key information. The software key panel 1002 displays the buttons that have the same functions as those of the hardware keys included in the display/operation unit 207. In the present example embodiment, the software key panel 1002 displays buttons respectively corresponding to the hardware keys of the image forming apparatus 102. However, the display content of the software key panel 1002 is not limited to this example. The software key panel 1002 may display the arrangement of keys different from the arrangement of hardware keys included in the image forming apparatus 102.

When the user presses a button on the software key panel 1002, the VNC client 520 sends the corresponding operation information (hardware key operation information) to the image forming apparatus 102. Specifically, the VNC client 520 provides a notification about a key code corresponding to the pressed key to the VNC server 320 as KeyEvent in the RFB protocol. Upon receiving the hardware key operation information, the VNC server 320 generates an event corresponding to the pressing of the corresponding hardware key in the display/operation unit 207 and performs processing. Thus, as with the operations on the hardware keys (e.g., 602 to 606) in the display/operation unit 207 of the image forming apparatus 102, the user shifts the focus using an up arrow key 1003, a right arrow key 1004, a down arrow key 1005, and a left arrow key 1006 in the software key panel 1002 displayed on the VNC client 520 and presses an OK button 1007 in a state where a desired item is selected, thereby allowing operations on the image forming apparatus 102.

The mobile terminal 103 that serves as the VNC client can be also operated via touches on its screen. The image forming apparatus 102 is operable also via direct touches on the screen 1001 displayed on the VNC client. For example, if the user wishes to select the item of "printing of printing adjustment sample" in a state where the screen illustrated in FIG. 10A is displayed, the user directly touches an area 1008 where the item of "printing of printing adjustment sample" is displayed on the screen 1001 displayed on the VNC client. When the user performs a touch operation on the screen of the VNC client 520, operation information is sent to the VNC server 320. Specifically, as the operation information, a notification about the coordinates of the touch position on the screen 1001 is provided to the VNC server 320 as PointerEvent in the RFB protocol. Upon receiving the touch operation information, the VNC server 320 performs hardware key operation conversion processing to be described below. As a result, the screen illustrated in FIGS. 8A and 8B is displayed on the display/operation unit 207 of the image forming apparatus 102 and is also displayed on the VNC client 520. In other words, an apparatus that does not support touch operations is remotely operable via touch operations by another apparatus that supports touch operations. As described above, the VNC client can remotely operate the image forming apparatus 102 via operations on the software key panel 1002 or direct touches on the screen 1001.

Figure 11:
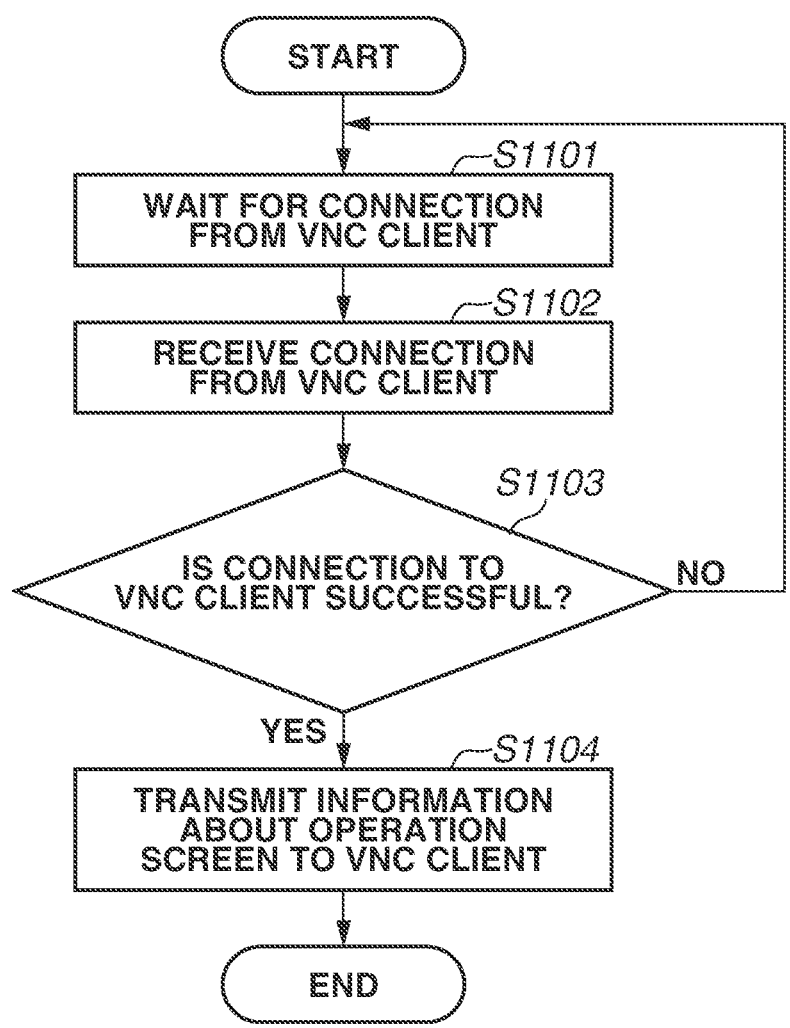
FIG. 11 is a flowchart illustrating connection processing with a virtual network computing (VNC) client according to one embodiment.

FIG. 11 is a flowchart illustrating processing performed by the VNC server 320 in the image forming apparatus 102 according to the present example embodiment. This processing is performed by the CPU 202 reading out programs for working control modules stored in the ROM 204 or the HDD 205 into the RAM 203 and running the programs.

In response to when the image forming apparatus 102 is powered on by the user, the VNC server is started by the system in the image forming apparatus 102. In the processing of starting the VNC server, in step S1101, the connection processing unit 321 opens a port for VNC connection and waits for a connection from the client.

The user operates the mobile terminal 103 to start the remote operation function by VNC. When the mobile terminal 103 sends a request for establishing a VNC connection to the image forming apparatus 102, in step S1102, the connection processing unit 321 receives the connection request from the client. In step S1103, it is determined whether the VNC connection is successful. If the VNC connection is successful (YES in step S1103), the processing proceeds to step S1104. If the VNC connection is unsuccessful (NO in step S1103), the processing returns to step S1101 to repeatedly perform the processing. If the VNC connection is successful (YES in step S1103), the processing proceeds to step S1104. In step S1104, the screen display unit 309 displays the operation screen generated by the screen generation unit 308 on the display of the display/operation unit 207, and the screen transmission unit 323 transmits information about the operation screen to the mobile terminal 103. This processing allows the display of the screen corresponding to the screen displayed on the image forming apparatus 102 on the mobile terminal 103.

Figure 12:
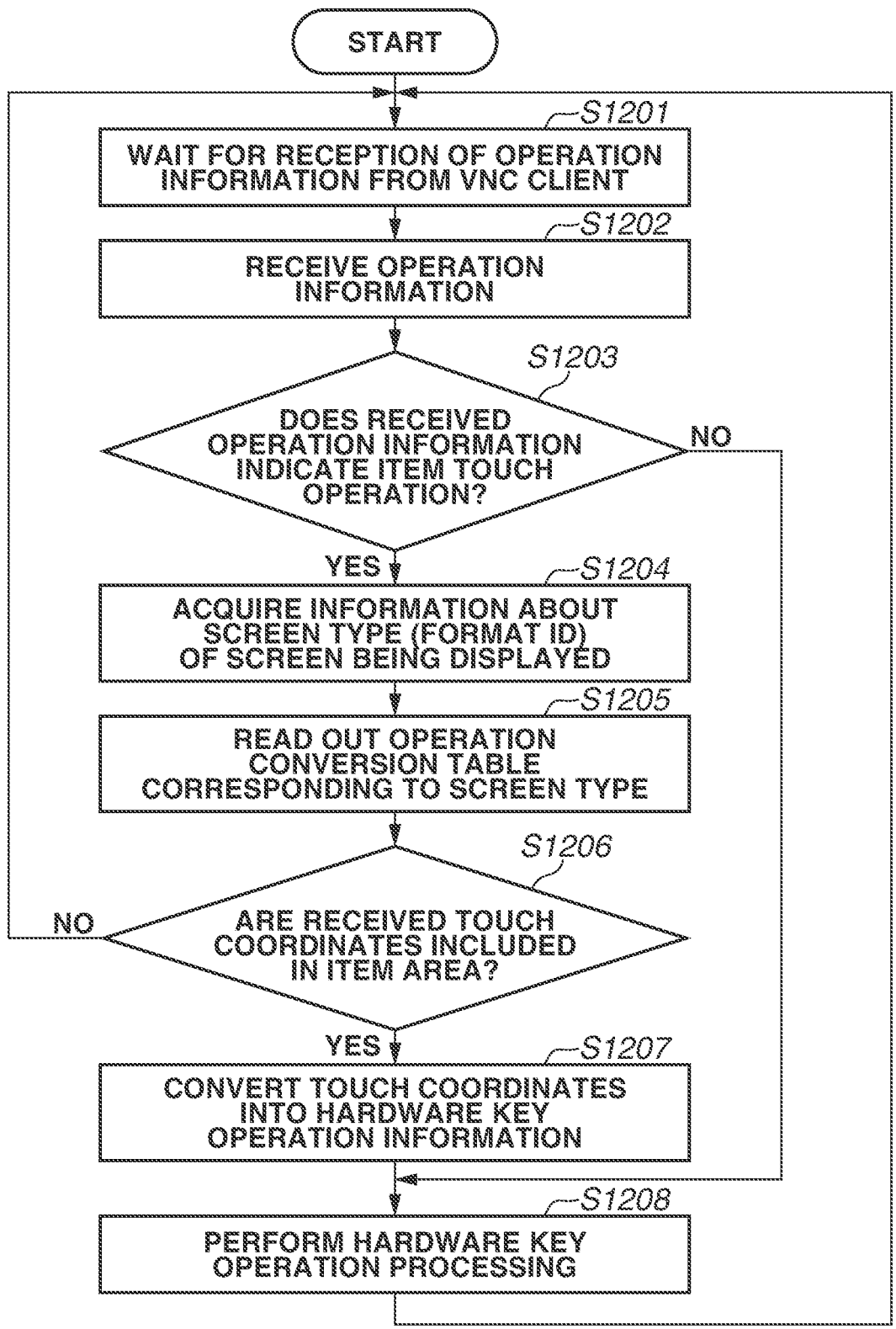
FIG. 12 is a flowchart illustrating operation information conversion processing on a VNC server according to one embodiment.

FIG. 12 is a flowchart illustrating operation information reception processing on the VNC server 320 in the image forming apparatus 102 according to the present example embodiment. This processing is performed by the CPU 202 reading out programs for working control modules stored in the ROM 204 or the HDD 205 into the RAM 203 and running the programs.

When the VNC server 320 is connected to the VNC client by the processing described above with reference to FIG. 11, in step S1201, the CPU 202 waits for a reception of operation information from the VNC client.

When the user performs a touch operation on the operation panel 406 of the mobile terminal 103, the VNC client 520 sends operation information corresponding to the touch operation to the VNC server 320. Touch operation information on the software key panel 1002 corresponding to the hardware keys included in the image forming apparatus 102 (this information is hereinafter referred to as hardware key operation information), or touch operation information on an area other than the software key panel 1002, for example, on the area 1008 (this information is hereinafter referred to as item touch operation information) is notified as operation information. In step S1202, the VNC server 320 receives this operation information. When the operation information is received, in step S1203, the CPU 202 determines whether the received operation information indicates item touch operation information. Specifically, the CPU 202 determines whether the received operation information indicates PointerEvent in the RFB protocol. If the received operation information indicates information other than the item touch operation information (that is, the received operation information indicates hardware key operation information) (NO in step S1203), the processing proceeds to step S1208. On the other hand, if the received operation information indicates the item touch operation information (YES in step S1203), the processing proceeds to step S1204.

In step S1204, the CPU 202 acquires screen type information (format ID) about the screen being displayed. Specifically, the CPU 202 sends an inquiry to the screen generation unit 308 to acquire the screen type information held in the screen generation unit 308. Next, in step S1205, the CPU 202 reads out an operation conversion table corresponding to the acquired screen type and screen state. An operation conversion table is a table in which the coordinates of each area (item area), such as a button, where an operation is received from the user, is associated with an alternative hardware key operation corresponding to the item area for each screen type and each screen state. The operation conversion table is preliminarily held in the HDD 205 or the ROM 204 of the image forming apparatus 102. FIGS. 13A to 13C, FIGS. 14A and 14B, and FIGS. 15A and 15B each schematically illustrate an operation conversion table.

FIG. 13A illustrates an example of an operation conversion table for the screen with the format ID=1. Rows 1301 to 1304 each indicate an item area. The coordinates of each area and operation information (alternative hardware key operation information) corresponding to the hardware key for reproducing the touch operation when the area is touched are stored in each of the rows 1301 to 1304. For example, Area 1 (1301) is an area where the x-coordinate is in the range from 0 to 132 and the y-coordinate is in the range from 13 to 24. In Area 1, the alternative hardware key operation indicates pressing of the OK key. Area 3 (1303) is an area where the x-coordinate is in the range from 0 to 132 and the y-coordinate is in the range from 37 to 48. In Area 3, the alternative hardware key operation indicates that pressing of the down arrow key, pressing of the down arrow key, and pressing of the OK key are performed in succession. While the present example embodiment illustrates an example where the OK key is pressed after directional keys are pressed, the event of pressing the OK key can be omitted. In other words, if a desired item is touched to shift the focus, an event of pressing the OK key may be generated by touching the item again.

FIG. 13B illustrates each item area in the operation conversion table illustrated in FIG. 13A. Area 1 (1301) corresponds to 1310, Area 2 (1302) corresponds to 1311, Area 3 (1303) corresponds to 1312, and Area 4 (1304) corresponds to 1313. For example, when the screen illustrated in FIGS. 7A to 7C is displayed as the screen with the format ID=1, Area 1 corresponds to the area where "preferences 701" is displayed, Area 2 corresponds to the area where "adjustment/maintenance 702" is displayed, Area 3 corresponds to the area where "printing of printing adjustment sample 703" is displayed, and Area 4 corresponds to the area where "management settings 704" is displayed.

The operation conversion table illustrated in FIG. 13A is an operation conversion table to be displayed when Area 1 (1310) is focused. As the area to be focused is changed, the alternative hardware key operation is also changed depending on the area. Thus, different operation conversion tables for the areas to be focused may be provided. FIG. 13C illustrates an operation conversion table to be displayed when Area 2 (1311) is focused. FIG. 13C illustrates the alternative hardware key operation for each area changed from that in FIG. 13A. Different operation conversion tables may be provided in advance for each area to be focused as described above, or an operation conversion table may be newly generated by deriving an alternative hardware key every time the focus is changed based on the operation conversion table illustrated in FIG. 13A.

Figures 14A, 14B:
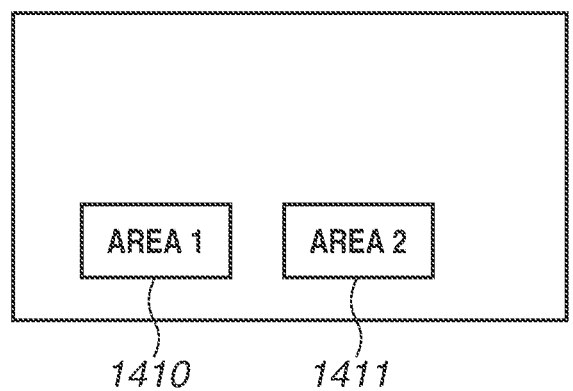
FIGS. 14A and 14B each illustrate an operation information conversion table and screen information according to one embodiment.
Figures 15A, 15B:
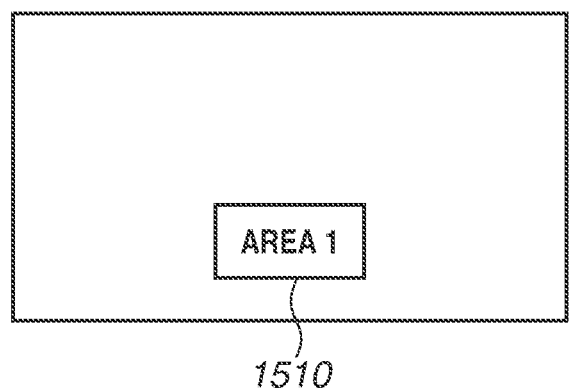
FIGS. 15A and 15B each illustrate an operation information conversion table and screen information according to one embodiment.

FIGS. 14A and 14B each illustrate an example of the operation conversion table with the format ID=2, and FIGS. 15A and 15B each illustrate an example of the operation conversion table with the format ID=3. In FIGS. 14A and 14B, Area 1 (1401) corresponds to 1410 and Area 2 (1402) corresponds to 1411. In FIGS. 15A and 15B, Area 1 (1501) corresponds to 1510. FIG. 14A illustrates an operation conversion table in a state where Area 2 is focused, and FIG. 15B illustrates an operation conversion table in a state where Area 1 is focused.

In step S1206, the CPU 202 determines whether the touch coordinates included in the received item touch operation information are included in the item area of the read operation conversion table.

For example, if the coordinates included in the received touch operation information indicate y=10 on the screen with the format ID=1, the coordinates do not correspond to the coordinates of Area 1 to Area 4. Hence, it is determined that the coordinates are not included in the item area. If it is determined that the coordinates are not included in the item area (NO in step S1206), the processing returns to step S1201 and the CPU 202 waits for a reception of the next operation information. In other words, if a section that is not included in the item area is touched, no processing is performed.

If it is determined that the touch coordinates are included in the item area (YES in step S1206), the processing proceeds to step S1207. In step S1207, the CPU 202 converts the coordinate information into the corresponding hardware key operation information. Specifically, the CPU 202 reads out information about the alternative hardware key operation on the corresponding item area from the operation conversion table, generates the corresponding hardware key event, and provides a notification about the generated hardware key event to the event processing unit 307.

In step S1208, the CPU 202 performs hardware key conversion processing. Specifically, the event processing unit 307 provides a notification about the received hardware key event to the applications 310, and the applications 310 execute processing corresponding to the received event. As a result of executing the processing, in updating the screen, the screen generation unit 308 generates a screen and provides a notification about the screen to the screen display unit 309. The screen display unit 309 displays the screen on the display unit 601 via the display/operation unit I/F 206. Further, the screen generation unit 308 transmits the generated screen to the VNC client 520 via the screen transmission unit 323.

After that, the processing returns to step S1201 and the CPU 202 waits for a reception of the next operation information.

The above-described processing in the flowchart enables a user to perform intuitive operations as touch operations on the operation screen displayed on the screen of the VNC client 520 in the mobile terminal 103. For example, if the area where "printing of printing adjustment sample" is displayed as represented by the coordinates (e.g., x=10, y=40) is touched in a state where the screen illustrated in FIG. 10A is displayed on the VNC client, the touch operation information is sent from the VNC client 520 to the image forming apparatus 102. The coordinates indicated by the received touch operation information are coordinates included in Area 3 on the screen with the format ID=1, and thus the touch operation is converted into a hardware key operation of pressing the down arrow key 604, pressing the down arrow key 604, and pressing the OK key 606, thereby executing processing. As a result, the OK key 606 will be pressed in a state where "printing of printing adjustment sample 703" is in the selected state as illustrated in FIG. 7C.

This enables the display to shift to the screen corresponding to "printing of printing adjustment sample" illustrated in FIGS. 8A and 8B.

A second example embodiment will be described. In the first example embodiment, the image forming apparatus 102 converts operation information received from the mobile terminal 103 into key operation information based on coordinate information included in the operation information and then executes processing. The second example embodiment illustrates an example where the mobile terminal 103 converts an operation received by the mobile terminal 103 into hardware key operation information and transmits the converted information to the image forming apparatus 102. The basic configuration of the present example embodiment is similar to that of the first example embodiment, and thus differences from the first example embodiment will be described.

In the present example embodiment, it is assumed that the mobile terminal 103 stores operation conversion tables as illustrated in FIGS. 13A to 13C, FIGS. 14A and 14B, and FIGS. 15A and 15B. The operation conversion tables may be acquired from the image forming apparatus 102 when the mobile terminal 103 performs VNC connection processing with the image forming apparatus 102. Alternatively, the MFP application 502 may preliminarily store the operation conversion tables in association with information about the image forming apparatus 102.

FIG. 16 is a flowchart illustrating operation information transmission processing in the mobile terminal 103. This processing is performed by the CPU 401 reading out programs for working control modules stored in the ROM 402 or the storage 404 into the RAM 403 and running the programs.

In step S1600, the screen reception unit 523 receives screen information from the image forming apparatus 102 and the screen control unit 503 displays a screen. The operation conversion table corresponding to the screen may be acquired from the image forming apparatus 102. In step S1601, a touch operation is received from the user on the displayed screen. In step S1602, it is determined whether the received touch operation corresponds to a touch operation on an area other than the software key panel 1002. If the received touch operation corresponds to a touch operation on the software key panel 1002 (NO in step S1602), the processing proceeds to step S1607. In step S1607, hardware key operation information is transmitted to the image forming apparatus 102. If the received operation corresponds to a touch operation on an area other than the software key panel 1002 (YES in step S1602), the processing proceeds to step S1603. In step S1603, information about the screen type of the screen being displayed is acquired. In step S1604, the operation conversion table corresponding to the acquired screen type and screen state is read out.

In step S1605, it is determined whether the touch coordinates are included in the item area. If the touch coordinates are not included in the item area (NO in step S1605), the processing returns to step S1601. If the touch coordinates are included in the item area (YES in step S1605), the processing proceeds to step S1606. In step S1606, the touch operation is converted into alternative hardware key operation information based on the read operation conversion table. In step S1607, the converted information is transmitted to the image forming apparatus 102.

In the above-described flowchart, the processing of step S1600 is performed every time screen information is transmitted from the image forming apparatus 102. The image forming apparatus 102 that has received the operation information transmitted in step S1607 performs processing corresponding to the operation information. After the VNC connection to the image forming apparatus 102 is finished, the operation conversion table acquired from the image forming apparatus 102 may be deleted, or may be stored in association with the information about the image forming apparatus 102 and may be reused in the subsequent processing.

In the above-described processing, the mobile terminal 103 converts operation information and transmits the converted operation information to the image forming apparatus 102, which enables the user to remotely operate the image forming apparatus 102 without complicated conversion processing.

Other Example Embodiments

The above-described example embodiments illustrate an example where the software key panel 1002 including the buttons respectively corresponding to the hardware keys included in the image forming apparatus 102 is displayed on the VNC client 520, thereby enabling remote operations on the image forming apparatus 102 via operations on the software key panel 1002 or direct touches on the screen 1001 displayed on the VNC client 520. However, the present invention is not limited to this example. For example, direct touch operations on the screen 1001 may be received without display of the software key panel 1002. In addition, the user may select whether to enable operation on the software key panel 1002 and/or direct touch operation on the screen 1001.

While the above-described example embodiments illustrate an example where one touch operation on the screen 1001 is converted into a hardware key operation, a drag operation, a flick operation, a pinch-in operation, or another operation may be converted into a hardware key operation. For example, if an upward flick operation is performed on a predetermined item area on the screen 1001, the operation may be converted into an operation of pressing the down arrow key a predetermined number of times.

While the above-described example embodiments illustrate an example where a screen corresponding to a screen displayed on the image forming apparatus 102 is displayed on the mobile terminal 103 via VNC connection, the present invention is not limited to this example. For example, the above-described example embodiments are also applicable, for example, when a screen obtained by extending the screen displayed on the image forming apparatus 102 is displayed on the mobile terminal 103, instead of displaying the screen corresponding to the screen displayed on the image forming apparatus 102.

Various embodiments of the present disclosure can also be implemented by executing the following processing. That is, software (program) for carrying out the functions according to the above-described example embodiments is supplied to a system or an apparatus via a network or various storage media, and a computer (or a CPU, a micro processing unit (MPU), or the like) of the system or the apparatus reads out the program and runs the program. In this case, the computer program and a storage medium storing the computer program are included in the embodiments of the present disclosure.

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-123272, filed Jul. 28, 2021, which is hereby incorporated by reference herein in its entirety.

What is claimed is:

1. An information processing apparatus configured to communicate with a terminal apparatus, the information processing apparatus comprising:
a plurality of hardware keys configured to act as operation units for selecting an item on an operation screen displayed on a display of the information processing apparatus, wherein the operation screen does not include any hardware keys;
a memory; and
at least one processor in communication with the memory, wherein the at least one processor is configured to perform:
transmitting, to the terminal apparatus, information about the operation screen, the information used by the terminal apparatus to display a remote operation screen at the terminal apparatus, and the remote operation screen corresponding to the operation screen;
receiving, from the terminal apparatus, user operation information including coordinate information, the user operation information based on a user operation received via the remote operation screen, wherein the user operation selects an item displayed on the remote operation screen;
converting the coordinate information into hardware key operation information corresponding to one or more operations that use the hardware keys, to select, at the information processing apparatus, the item selected via the remote operation screen at the terminal apparatus; and
executing processing based on the hardware key operation information.

2. The information processing apparatus according to claim 1, wherein the terminal apparatus is an apparatus configured to determine a user operation based on coordinate information, and the information processing apparatus is an apparatus that is not able to determine a user operation based on coordinate information.

3. The information processing apparatus according to claim 1, wherein the terminal apparatus is an apparatus configured to support a touch operation, and the information processing apparatus is an apparatus that is not able to support a touch operation.

4. The information processing apparatus according to claim 1, wherein the terminal apparatus is an apparatus configured to support an operation that uses a pointing device, and the information processing apparatus is an apparatus that is not able to support an operation that uses a pointing device.

5. The information processing apparatus according to claim 1,
wherein the at least one processor is further configured to:
store, for each of a plurality of items displayed on the operation screen, the following information in association with each another: (i) coordinate information corresponding to the item, and (ii) hardware key operation information corresponding to the one or more operations using the hardware keys for selecting the item on the operation screen,
wherein the converting is performed based on the stored information.

6. The information processing apparatus according to claim 1, wherein in response to a touch operation performed on an item on the remote operation screen, information about the touch operation is converted into hardware key operation information corresponding to one or more hardware key operations that include an operation to shift an item on the operation screen into a selected state and an operation to determine the shifted to item as the selected item.

7. The information processing apparatus according to claim 1, wherein the information processing apparatus is an apparatus functioning as a virtual network computing (VNC) server.

8. The information processing apparatus according to claim 1, wherein the hardware keys include a key for shifting an item on the operation screen into a selected state.

9. The information processing apparatus according to claim 1, wherein the information processing apparatus is an image forming apparatus including at least one of a print function or a scan function.

10. The information processing apparatus according to claim 1, wherein at least one of the hardware keys is a directional key, and the received user operation information is converted into hardware key operation information corresponding to at least the directional key based on the coordinate information included in the received user operation information.

11. The information processing apparatus according to claim 1, wherein the received user operation information is converted into hardware key operation information corresponding to two or more operations using the hardware keys, the hardware key operation information to be used to select at the information processing apparatus the item selected by the user operation at the terminal apparatus.

12. The information processing apparatus according to claim 11, where the two or more hardware key operations are performed successively one after another.

13. The information processing apparatus according to claim 1,
wherein the operation screen is one of a plurality of different operation screen types, and
after executing the processing based on the hardware key operation information, the information processing apparatus transmits, to the terminal apparatus, information about another operation screen type of the plurality of operation screen types.

14. An information processing system comprising:
an information processing apparatus having a plurality of hardware keys including a key for shifting an item displayed on a screen at the information processing apparatus into a selected state, wherein the screen does not include any hardware keys, and
a terminal apparatus having a user interface that receives a user selection based on coordinate information,
wherein the information processing apparatus comprises:
a transmitter configured to transmit, to the terminal apparatus, screen information corresponding to the screen, the information to be used at the terminal apparatus to display a remote screen corresponding to the screen displayed at the information processing apparatus;
a receiver configured to receive user operation information containing coordinate information from the terminal apparatus; and
a controller configured to convert the coordinate information into hardware key operation information corresponding to one or more operations that use one or more hardware keys of the information processing apparatus, to select, at the information processing apparatus, an item corresponding to an item selected by a user operation on the remote screen, and
wherein the terminal apparatus comprises:
a controller configured to generate the remote screen corresponding to the screen displayed at the information processing apparatus,
a user interface configured to receive the user operation on the remote screen, and
a transmitter configured to transmit the user operation information to the information processing apparatus.

15. The information processing system according to claim 14, wherein the terminal apparatus is an apparatus configured to determine a user operation based on coordinate information, and the information processing apparatus is an apparatus that is not able to determine a user operation based on coordinate information.

16. The information processing system according to claim 14, wherein the terminal apparatus is an apparatus configured to support a touch operation, and the information processing apparatus is an apparatus that is not able to support a touch operation.

17. The information processing system according to claim 14, wherein the terminal apparatus is an apparatus configured to support an operation using a pointing device, and the information processing apparatus is an apparatus that is not able to support an operation using a pointing device.

18. The information processing system according to claim 14, further comprising a storage unit configured to store, for each of a plurality of items displayed on the operation screen, the following information in association with each another: (i) coordinate information corresponding to the item, and (ii) hardware key operation information corresponding to the one or more operations using the hardware keys for selecting the item on the operation screen,
wherein the conversion unit performs the converting based on the information stored in the storage unit.

19. The information processing system according to claim 14, wherein in response to a touch operation performed on an item included in the remote operation screen, the controller converts information about the touch operation into hardware key operation information corresponding to one or more hardware key operations that include an operation to shift an item on the operation screen into a selected state and an operation to determine the shifted to item as the selected item.

20. A method for an information processing apparatus configured to communicate with a terminal apparatus, the information processing apparatus having a plurality of hardware keys configured to act as operation units for selecting an item on an operation screen displayed on a display of the information processing apparatus, the operation screen not including any hardware keys, and
   the method comprising:
      transmitting, to the terminal apparatus, information about the operation screen, the information used by the terminal apparatus to display a remote operation screen at the terminal apparatus, and the remote operation screen corresponding to the operation screen;
   receiving, from the terminal apparatus, user operation information including coordinate information, the user operation information based on a user operation received via the remote operation screen, wherein the user operation selects an item displayed on the remote operation screen;
   converting the coordinate information into hardware key operation information corresponding to one or more operations that use the hardware keys, to select, at the information processing apparatus, the item selected via the remote operation screen at the terminal apparatus; and
   executing processing based on the hardware key operation information.

* * * * *